United States Patent
Bar-Ness et al.

(10) Patent No.: US 8,130,846 B2
(45) Date of Patent: Mar. 6, 2012

(54) SYSTEM AND METHOD FOR SINGLE-CARRIER SPACE-FREQUENCY BLOCK CODED TRANSMISSION OVER FREQUENCY SELECTIVE AND FAST FADING CHANNELS

(75) Inventors: Yeheskel Bar-Ness, Marlboro, NJ (US); Kodzovi Acolatse, Newark, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 1017 days.

(21) Appl. No.: 12/001,469

(22) Filed: Dec. 11, 2007

(65) Prior Publication Data
US 2008/0165865 A1 Jul. 10, 2008

Related U.S. Application Data

(60) Provisional application No. 60/874,144, filed on Dec. 11, 2006.

(51) Int. Cl.
*H04B 1/66* (2006.01)

(52) U.S. Cl. ........ 375/241; 375/260; 375/265; 375/267; 375/295; 375/299; 375/316; 375/340; 375/347; 370/203; 370/204; 370/206; 370/208; 370/210; 370/334; 370/480; 455/91; 455/101; 455/132; 455/296; 455/500; 455/562.1

(58) Field of Classification Search ................. 375/260, 375/265, 270, 277, 295, 316, 340, 241, 267, 375/299, 347; 370/203, 204, 206, 208, 210, 370/480, 334; 455/91, 101, 132, 296, 500, 455/562.1

See application file for complete search history.

(56) References Cited

U.S. PATENT DOCUMENTS

| | | | | |
|---|---|---|---|---|
| 6,377,632 B1 * | 4/2002 | Paulraj et al. | ................. | 375/299 |
| 7,680,200 B2 * | 3/2010 | Kwun et al. | ................. | 375/260 |
| 7,729,433 B2 * | 6/2010 | Jalloul et al. | ................. | 375/260 |

FOREIGN PATENT DOCUMENTS

| | | |
|---|---|---|
| EP | 1705823 A1 | 9/2006 |
| EP | 1775872 A2 | 4/2007 |
| WO | WO 2006/060651 A1 | 6/2006 |

OTHER PUBLICATIONS

International Preliminary Report on Patentability for PCT/IB2007/004115, issued Jun. 16, 2009.
S. Alamouti, "A Simple Transmit Diversity Technique for Wireless Communications", *IEEE Journal on Select Areas in Communications*, vol. 16, No. 8, pp. 1451-1458, Oct. 1998.
V. Tarokh et al., "Space-Time Block Coding for Wireless Communications: Performance Results", *IEEE Journal on Selected Areas in Communications*, vol. 17, No. 3, pp. 451-460, Mar. 1999.
K. F. Lee and D. B. Williams, "A Space-Time Coded Transmitter Diversity Technique for Frequency Selective Fading Channels", *2000 IEEE*, pp. 149-152, 2000.

(Continued)

*Primary Examiner* — Leon Flores

(57) ABSTRACT

A single carrier transmission scheme which utilizes space-frequency block coding and frequency domain equalization (SF-SCFDE) is proposed for frequency selective and fast fading channel. It is shown that employing this technique in slow fading environment depicts the same performance as that obtained with space-time coding scheme. However, in the more difficult fast fading channels, the proposed scheme exhibits much better performance.

15 Claims, 3 Drawing Sheets

OTHER PUBLICATIONS

K. F. Lee and D. B. Williams, "A Space-Frequency Transmitter Diversity Technique for OFDM Systems", *2000 IEEE*, pp. 1473-1477, 2000.

D. Falconer et al., "Frequency Domain Equalization for Single-Carrier Broadband Wireless Systems", *IEEE Communications Magazine*, pp. 58-66, Apr. 2002.

W. M. Younis et al., "Adaptive Frequency-Domain Equalization of Space-Time Block-Coded Transmissions", *2002 IEEE*, pp. III-2353-2356, 2002.

Z. Wang and Yeheskel Bar-Ness, "Peak-to-Average Power Ratio Reduction by Polyphase Interleaving and Inversion for SFBC MIMO-OFDM with Generalized Complex Orthogonal Code", IEEE Conference on Information Sciences and Systems, pp. 317-320, Mar. 2006.

T. W. Yune et al., "Single Carrier Frequency-Domain Equalization With Transmit Diversity Over Mobile Multipath Channels", *IEICE Transactions on Communications*, vol. E89-B, No. 7, Jul. 2006.

K. Acolaste et al., "A Novel MIMO SC-DS-CDMA HARQ scheme for Frequency Selective and Time Varying Channels", *IEEE International Symposium on Spread Spectrum Techniques and Applications*, pp. 297-301, Aug. 2006.

International Search Report for PCT/IB2007/004115, mailed May 8, 2008.

European Patent Office Communication for European Patent Application No. 07 859 195.5, dated Oct. 14, 2009.

Examination Report for GB Application 0911878.7, mailed Jan. 26, 2011.

\* cited by examiner ent application relates to U.S. Provisional Patent
SYSTEM AND METHOD FOR SINGLE-CARRIER SPACE-FREQUENCY BLOCK CODED TRANSMISSION OVER FREQUENCY SELECTIVE AND FAST FADING CHANNELS

CROSS-REFERENCE TO RELATED PATENT APPLICATIONS

The present application relates to U.S. Provisional Patent Application 60/874,144, filed on Dec. 11, 2006, and entitled "METHOD AND SYSTEM FOR A SINGLE CARRIER SPACE-FREQUENCY BLOCK CODED TRANSMISSION OVER FREQUENCY SELECTIVE AND FAST FADING CHANNELS," which is incorporated herein in its entirety and forms a basis for a claim of priority.

FIELD

Embodiments of the present application relate to the field of single carrier transmission schemes in communication systems. Exemplary embodiments relate to a method and system for single carrier space-frequency block coding transmission.

BACKGROUND

The rapid increase of the demand for wireless applications has stimulated tremendous research efforts in developing systems that support reliable high rate transmissions over wireless channels. However, these developments must cope with challenges such as multipath fading, time varying nature of the wireless channel, bandwidth restrictions and handheld devices power limitations. Space-time transmission techniques have been proven to combat the detrimental efforts of the multipath fading. Unfortunately, the large delay spreads of frequency selective fading channels destroy the orthogonality of the received signals which is critical for space-time coding. Consequently, the techniques are only effective over frequency flat block fading channels. Orthogonal frequency division multiplexing (OFDM) has also shown to combat the multipath fading. A space-time OFDM (ST-OFDM) and space-frequency OFDM (SF-OFDM) have been proposed as an effective way to combat the frequency selectivity of the channel. Moreover, SF-OFDM can be applied to fast fading channel wherein the channel doesn't need to be constant for at least two block transmission as it is usually required for ST-OFDM scheme. OFDM is a multicarrier communication technique, with which a single data stream is transmitted over a number of lower rate subcarriers. A multicarrier signal consists of a number of independent modulated subcarriers that can cause a large peak-to-average PAPR when the subcarriers are added up coherently. Also OFDM suffer from phase noise and the frequency offset problems. Therefore, to combat the frequency selectivity of the channel, an alternative solution for OFDM was proposed that utilizes single carrier transmission with frequency domain equalization. In parallel to ST-OFDM scheme, a space-time single carrier (ST-SC) transmission scheme was proposed in that requires the channel to be same for at least two block periods.

Although many high rate wireless communication method and systems have been proposed, none provide a space-frequency single carrier (SF-SC) technique which doesn't require the channel to be the same for two block periods, and hence beneficial for fast fading channel. Prior methods and systems do not use a single carrier transmission technique that implements space-frequency block coding with additional frequency diversity as shown in the next section.

SUMMARY

Aspects of the exemplary embodiments are directed to a single carrier transmission scheme which utilizes space-frequency block coding and frequency domain equalization (SF-SCFDE). Such a technique can be used with frequency selective and fast fading channel.

In one exemplary embodiment, a method for single carrier space-frequency (SF-SCFDE) transmission over frequency selective and fast fading channel includes receiving communication block streams, encoding the received communication block streams to produce communication blocks, adding a cyclic prefix to each communication block to form transmission blocks, and communicating each transmission block through a frequency selective fading channel.

In another exemplary embodiment, an apparatus for single carrier space-frequency (SF-SCFDE) transmission over frequency selective and fast fading channel includes a space-frequency encoder that receives and encodes communication block streams, a cyclic prefix adder that adds a cyclic prefix to each communication block, and antennas that communicate each communication block.

In yet another exemplary embodiment, a system for single carrier space-frequency (SF-SCFDE) transmission over frequency selective and fast fading channel includes a transmitter and a receiver. The transmitter includes a space-frequency encoder that receives and encodes communication block streams, a cyclic prefix adder that adds a cyclic prefix to each communication block, and antennas that communicate each communication block. The receiver includes antennas that receive communication blocks from the transmitter, a structure to remove the cyclic prefix, and a decoder.

These and other features, aspects and advantages of the present invention will become apparent from the following description, appended claims, and the accompanying exemplary embodiments shown in the drawings, which are briefly described below.

DETAILED DESCRIPTION

Exemplary embodiments are described below with reference to the accompanying drawings. It should be understood that the following description is intended to describe exemplary embodiments of the invention, and not to limit the invention.

Figure 1:
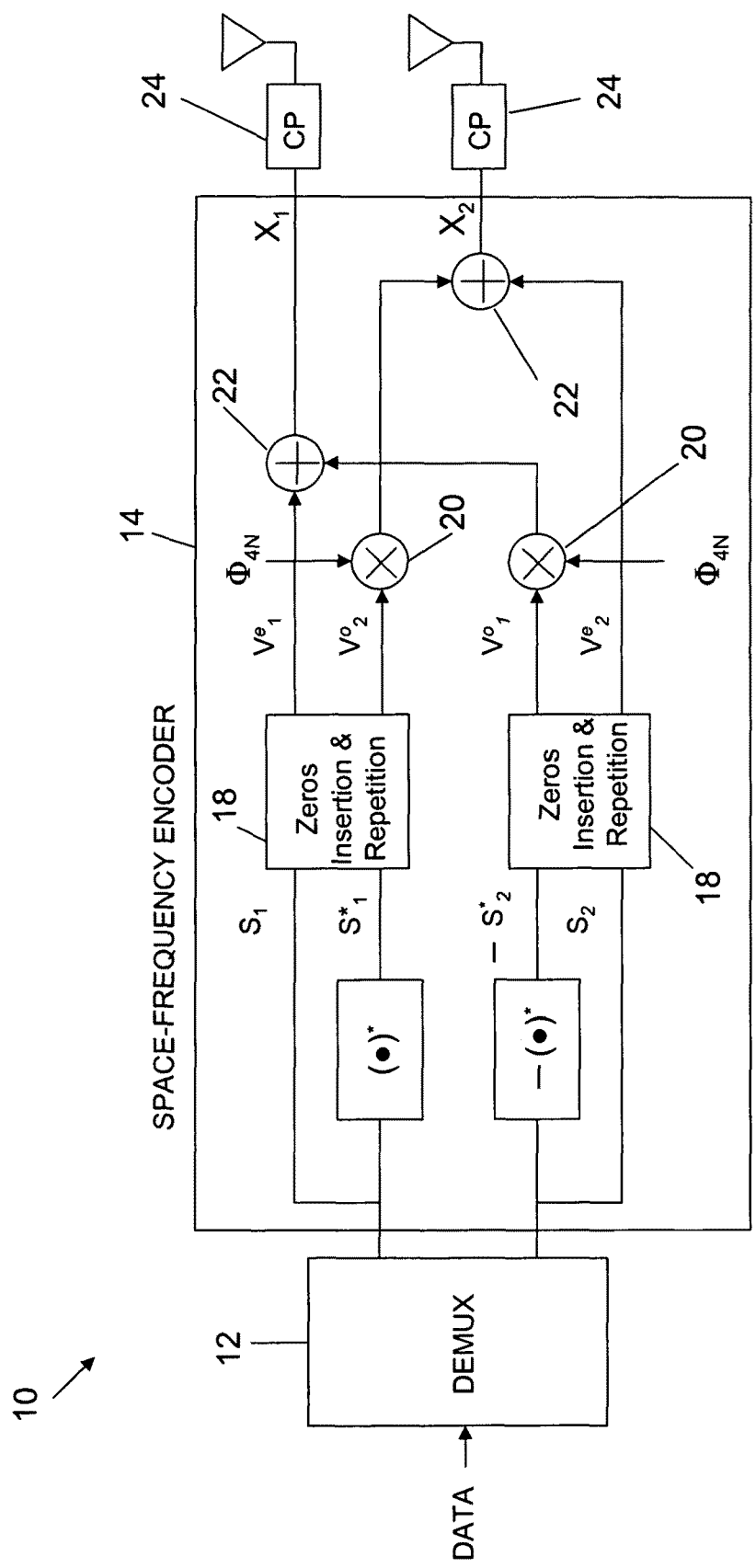
FIG. 1 is a general diagram of a transmitter in accordance with an exemplary embodiment.

FIG. 1 illustrates a transmitter 10 having $N_t=2$ transmit antennas and $N_r=1$ receive antenna. The information bearing data symbols d(n) belonging to an alphabet A are first demultiplexed into two block streams of N symbols each for transmission for either transmit antennas using a demultiplexer 12. The communication block is represented by $s_k=[s_k(0), s_k(1), \ldots s_k(N-1)]^T$ and is transmitted by the $k^{th}$ transmit antenna, k=1.2 with $|s_k(n)|^2=1$, whose N-point Discrete Fourier Transform (DFT) is given by $[S_k=(0), S_k(1), \ldots, S_k(N-1)]^T$. The two symbols blocks $s_1$ and $s_2$ are then fed to a space-frequency encoder 14 suitable for SCFDE to produce the following two blocks:

$$u_1 = [s_{1,0}, -s^*_{2,0}, s_{1,1}, -s^*_{2,N-1}, \ldots, s_{1,N-1}, -s^*_{2,1}]^T$$

$$u_2 = [s_{2,0}, s^*_{1,0}, s_{2,1}, s^*_{1,N-1}, \ldots, s_{2,N-1}, s^*_{1,1}]^T \quad (1)$$

where $s_{k,n} = s_k(n)$. These two blocks $u_1$ and $u_2$ are then compressed from symbol duration $T_s$ to $T_s/2$ and the compressed vector is repeated twice to form the following blocks $$v_k = [u_k^T, u_k^T]^T; k=1,2 \quad (2)$$

The vector $v_k$ is denoted by $v_{k,e}$ ($v_{k,o}$) with the odd (even) elements made zeros i.e. $v_{k,e} = [s_{k,e}^T, s_{k,e}^T]^T$, $k=1, 2$ and $v_{1,o}[-s_{2,o}^T, -s_{2,o}^T]^T$, $v_{2,o} = [s_{1,o}^T, s_{1,o}^T]^T$ where $$s_{k,e} = [s_k(0), 0, s_k(1), 0, \ldots, s_1(N-1), 0]^T$$

$$s_{k,o} = [0, s^*_k(0), 0, s^*_k(N-1), \ldots, 0, s^*_k(2), 0, s^*_k(1)]^T \quad (3)$$

The zeros insertion and repetition operation is performed at blocks 18 in FIG. 1. Before transmission, the vectors $v_{k,o}$ are multiplied by a phase shift matrix $\Phi_{4N}$ using multipliers 20:

$$\Phi_{4N} = \text{diag}\left(1, e^{\frac{j2\pi}{4N}}, e^{\frac{j2\pi 2}{4N}}, \ldots, e^{\frac{j2\pi(4N-1)}{4N}}\right), \quad (4)$$

to create one element forward shift in their Fourier transform. The transmitted signals vector from the two antennas are then given by $$x_k = \sqrt{P_o/8N}(v_{k,e} + \Phi_{4N}v_{k,o}), k=1,2 \quad (5)$$

where $P_o$ is the total transmitted power. As shown in FIG. 1, adders 22 are used for the $(v_{k,e} + \Phi_{4N}v_{k,o})$ operation in (5). At blocks 24, a cyclic prefix (CP) is added to each block before transmitting through a frequency selective fading channel of order L. $h_k=[h_k(0), h_k(1), \ldots, h_k(L-1)]$ where $h_k(l)$ is the $l^{th}$ response of the channel impulse response (CIR) between the $k^{th}$ transmit antenna and the receive antenna. The received signal vector y is given by $$y = \sum_{k=1}^{2} x_k^{(CP)} \otimes h_k + w \quad (6)$$

where $x_k^{(CP)}$ is $x_k$ with the CP added and w is an added noise vector assumed AWGN with variance $N_o$ and $\otimes$ denotes the linear convolution. Since the CP turns the linear convolution into a circular, the received signal vector after the removal of the CP and taking the 4N-point DFT is given by $$Y = \sum_{k=1}^{2} \Lambda_k X_k + W \quad (7)$$

where $\Lambda_k$, $k=1,2$ represent diagonal matrices whose elements are the 4N-point DFT of the corresponding CIR $h_k \cdot X_k$ and W represents the 4N-point DFT of $x_k$ and w respectively.

From (5), it follows:

$$X_k = \sqrt{P_o/8N}(V_{k,e} + \tilde{V}_{k,o}), k=1,2 \quad (8)$$

where $V_{k,e}$, $V_{k,o}$, and $\tilde{V}_{k,o}$ represent the 4N-point DFT of $v_{k,e}$, $v_{k,o}$ and $(\Phi_{4N}v_{k,o})$ respectively. Now it follows that $$V_{k,e} = [S_{k,e}^T \cdot S_{k,e}^T]^T \quad (9)$$

$$\tilde{V}_{2,o} = \Phi_{4N}[S_{1,o}^T \cdot S_{1,o}^T]^T$$

$$\tilde{V}_{1,0} = \Phi_{4N}[S_{2,o}^T \cdot -S_{2,o}^T]^T$$

where $$S_{k,e} = [S_k(0), 0, S_k(1), 0, \ldots, S_{k'}(N-1), 0]^T \quad (10)$$

$$S_{k,o} = [0, S^*_k(0), 0, S^*_k(N-1), \ldots, 0, S^*_k(1)]^T$$

$$\Phi_{4N} = \text{diag}\left(0, 1, e^{\frac{jo*}{4N}}, e^{\frac{jo*o}{4N}}, \ldots, e^{\frac{jo*(4N-2)}{4N}}\right)$$

It is proposed that the 4N-point DFT of a 4N elements vector of the form $[p_e^T, p_e^T]^T$ where $p_e=[p(0),0,\ldots,p(N-1),0]^T$ is $[P_e^T, P_e^T]^T$ where $P_e=[P(0),0,\ldots,P(N-1),0]^T$ and the vector $[P(0), P(1), \ldots, P(N-1)]^T$ is the N-point DFT of $[p(0), p(1), \ldots, p(N-1)]^T$. To prove (9), it can be seen from the foregoing proposition that $V_{k,e}$ is the 4N-point DFT of $v_{k,e} = [s_{k,e}^T, s_{k,e}^T]^T$ where $s_{k,e}$ is defined in (3) hence $V_{k,e}=[S_{k,e}^T, S_{k,e}^T]^T$. Next the vector $\vec{s}_k=[s^*_k(0),0, s^*_k(N-1), \ldots, 0, s^*_k(2),0, s^*_k(1),0]^T$ is defined which is one element circular shift to the left of $s_{k,o}$ in (3), that is $s_{k,o}(n)=\vec{s}_k(n-1)$ and $\vec{v}_{2,o}=[\vec{s}_1^T, \vec{s}_1^T]^T$ i.e. $v_{2,o}(n)=\vec{v}_{2,o}(n-1)$.

Using the shift property of DFT, the 4N-point DFT of $v_{2,o}$ is given by $$V_{2,o} = \Phi_{4N}\tilde{V}_{2,o} \quad (11)$$

where $\tilde{V}_{2,o}$ is the 4N-point DFT of $\vec{v}_{2,o}$. Using the statement above and applying the N-point DFT of $[s^*_1(0), s^*_1(N-1), \ldots, s^*_1(2), s^*_1(1)]^T$ as $[S^*_1(0), S^*_1(1), \ldots, S^*_1(N-2), S^*_1)N-1)]^T$ on $\tilde{V}_{2,o}$ it follows that $\tilde{V}_{2,o}=[\tilde{S}_1^T, \tilde{S}_1^T]^T$ where $\tilde{S}_1=S^*_{1,e}$. With $\tilde{v}_{2,o}=\Phi_{4N}v_{2,o}$ and using the inverse of the shift property of DFT, it follows that $\tilde{V}_{2,o}(m)=V_{2,l}(m-1)$ i.e. $\tilde{V}_{2,o}$ is one element circular shift to the right of $V_{2,o}$. Using (11), it follows that $\tilde{V}_{2,o}=\Phi_{4B}[S_{1,o}^T, S_{1,o}^T]^T$ where $\Phi_{4N}$ is defined in (10). One can follow the same procedure to show that $\tilde{V}_{1,o}=\Phi_{4N}[-S_{2,o}^T, -S_{2,o}^T]^T$.

Now for a vector A, $A^e$ and $A^o$ are defined to be the even and odd parts of A respectively. From (9), it follows $$V_{1,e}^e=[S_k^T, S_k^T]^T, V_{k,e}^o=[0_N^T, 0_N^T]^T$$

$$\tilde{V}_{1,o}^o=\Phi_{2N}[-S_2^H, -S_2^H]^T, \tilde{V}_{2,o}^o=\Phi_{2N}[S_x^H, S_1^H]^T.$$

$$V_{k,o}^e=[0_N^T, 0_N^T]^T, k=1,2 \quad (12)$$

where $$\Phi_{2N} = \text{diag}\left(1, e^{\frac{j2\pi}{4N}}, e^{\frac{j2\pi 2}{4N}}, \ldots, e^{\frac{j2\pi(2N-1)}{2N}}\right),$$

is a 2N×2N diagonal matrix whose diagonal elements are the odd diagonal elements of $\Phi_{4N}$ of ((10)) and $0_N$ is a zero vector of length N. It then follows that $$X_k^e=\sqrt{P_o/8N}[S_k^T, S_k^T]^T$$

$$X_1^o=\sqrt{P_o/8N}\Phi_{2N}[-S_2^H, -S_2^H]^T$$

$$X_2^o=\sqrt{P_o/8N}\Phi_{2N}[S_1^H, S_1^S]^T \quad (13)$$

From ((13)) it can be seen that:

$$X_2^e=\Phi_{2N}X_1^{e*}$$

$$X_1^o=-\Phi_{2N}X^{e*} \quad (14)$$

Eq ((7)) can then be rewritten as $$Y^e = \Lambda_1^e X_1^e + \Lambda_2^e X_2^e + W^e \quad (15)$$
$$Y^o = \Lambda_1^o X_1^o + \Lambda_2^o X_2^o + W^o$$
$$= -\Lambda_1^o \Phi_{2N} X_2^{e*} + \Lambda_2^o \Phi_{2N} X_1^{e*} + W^o,$$

where $\Lambda_k^e$ and $\Lambda_k^o$ are diagonal matrices whose diagonal elements are the even and odd diagonal elements of $\Lambda_k$ respectively. Assuming that the channel gains for adjacent subcarriers are approximately equal, i.e. $\Lambda_k^e \approx \Lambda_k^o$, k=1,2; hence combining ((15)) gives $$\begin{pmatrix} Y^e \\ Y^{o*} \end{pmatrix} = \begin{pmatrix} \Lambda_1^e & \Lambda_2^e \\ \Phi_{2N}^* \Lambda_2^{e*} & -\Phi_{2N}^* \Lambda_1^{e*} \end{pmatrix} \begin{pmatrix} X_1^e \\ X_2^e \end{pmatrix} + \begin{pmatrix} W^e \\ W^{o*} \end{pmatrix} \quad (16)$$

The first and second N terms of $Y^e$ and $Y^o$ are defined respectively for k=1,2 by $$Y_k^e = [Y^e((k-1)N), \ldots, Y^e(kN-1)]^T$$

$$Y_k^o = [Y^o((k-1)N), \ldots, Y^o(kN-1)]^T \quad (17)$$

Plugging ((13)) and ((17)) in ((16)) arrives at:

$$Z = AS + \tilde{W} \quad (18)$$
where $$Z = [Y_1^{eT}, Y_2^{eT}, Y_1^{o*T}, Y_2^{o*T}]^T, S = [S_1^T, S_2^T]^T \quad (19)$$
$$\tilde{W} = [W_1^{eT}, W_2^{eT}, W_1^{oT}, W_2^{oT}]^T$$

$$\Lambda = \sqrt{P_o/8N} \begin{pmatrix} \Lambda_{1,1}^e & \Lambda_{2,1}^e \\ \Lambda_{1,2}^e & \Lambda_{2,2}^e \\ \Phi_{2N,1}^* \Lambda_{2,1}^{e*} & -\Phi_{2N,1}^* \Lambda_{1,1}^{e*} \\ \Phi_{2N,2}^* \Lambda_{2,2}^{e*} & -\Phi_{2N,2}^* \Lambda_{1,2}^{e*} \end{pmatrix}$$

where $\Lambda_{k,1}^e$ and $\Lambda_{k,2}^e$ are N×N diagonal matrices whose diagonal elements are the first and last N diagonal elements of $\Lambda_k^e$ and $\Lambda_{2,1}^e, \Lambda_{2,2}^e, \Phi_{2N,1}, \Phi_{2N,2}$ are similarly defined. Note that $|\Phi_{2N}|^2 = I_{2N}, |\Phi_{2N,1}|^2 = |\Phi_{2N,2}|^2 = I_N$ where for a diagonal matrix D we defined $|D|^2 = DD^*$. The proposed space-frequency decoder gives the estimation $\hat{S}$ according to the following $$\hat{S} = (\Lambda^H \Lambda)^{-1} \Lambda^H Z \quad (20)$$

It can be shown that the matrix $\Lambda^H \Lambda$ is diagonal and given by $$\Lambda^H \Lambda = \begin{pmatrix} |\Delta|^2 & 0 \\ 0 & |\Delta|^2 \end{pmatrix} \quad (21)$$

where $$|\Delta|^2 = \frac{P_o}{8N}(|\Lambda_{1,1}^e|^2 + |\Lambda_{1,2}^e|^2 + |\Lambda_{2,1}^e|^2 + |\Lambda_{2,2}^e|^2)$$

hence $S_1$ and $S_2$ are completely decoupled. The estimates in (20) are transformed back in time domain for detection.

Figure 2:
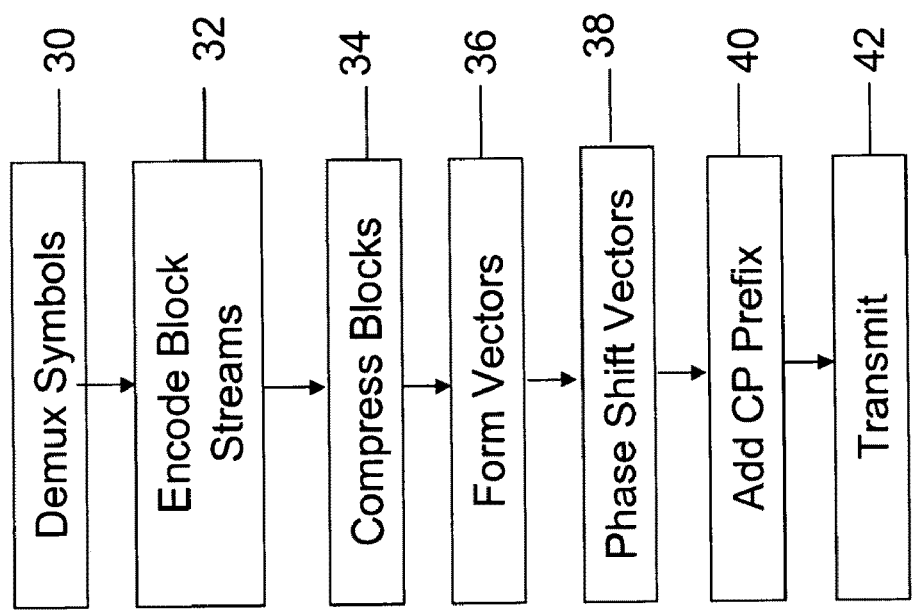
FIG. 2 is a flow diagram depicting operations performed in the single carrier space-frequency (SF-SCFDE) transmission scheme of the transmitter of FIG. 1.

FIG. 2 illustrates operations performed in an exemplary single carrier space-frequency (SF-SCFDE) transmission technique utilized by transmitter 10 described with reference to FIG. 1. Additional, fewer or different operations may be performed depending on the embodiment. In an operation 30, data symbols d(n) belonging to an alphabet A are demultiplexed into two block streams of N symbols. In an operation 32, the block streams are encoded into communication blocks.

The communication blocks are compressed into vectors in an operation 34 and the compressed vectors are repeated twice to form vector blocks in an operation 36. Once the vector blocks are formed, they are phase shifted using a phase shift matrix (operation 38). This phase shift creates a one element forward shift in the Fourier transform. In an operation 40, a cyclic prefix (CP) is added to each phase shifted vector block. Once the CP prefix is added, the blocks are transmitted through a frequency selective fading channel of order L. Upon receipt of the communicated blocks, the CP prefix is removed and a 4-N point DFT is determined.

The exemplary single carrier space-frequency (SF-SCFDE) transmission scheme over frequency selective and fast fading channel described herein has been shown to be an efficient and effective transmission technique especially for application where channel is fast fading. The bit error rate (BER) performance of the exemplary space-frequency single carrier system was calculated in a simulation. The simulation used a single carrier transmission with N=64 data symbols per block in a frequency selective channel assumed to be a COST207 six-ray (L=6) typical urban channel. The BER performance was shown to outperform the ST-OFDM described by K. F. Lee and D. B. Williams in "A space-time coded transmitter diversity technique for frequency selective fading," in IEEE Sensor Array and Multichannel Signal Processing Workshop, pp. 149-152, March 2000 and "A space-frequency diversity technique for OFDM system," IEEE GLOBECOM, pp. 1473-1477, November 2000 (referred to below as "Lee and Williams"). It also outperformed the conventional OFDM system in the same channel. The performance of SF-SCFDE described herein was also compared with that of ST-SCFDE described in W. M. Younis, N. Al-Dhahir, and A. H. Sayed, "Adaptive frequency-domain equalization of space-time block-coded transmissions," in IEEE Int. Conf. Accoust., Speech, Signal Process., vol. 3, Orlando, Fla. May 2002, pp. 2353-2356 (referred to below as "Younis"), in slow fading channel (where the normalized Doppler frequency is 0.001) and fast fading channel (where the normalized Doppler frequency is 0.05). Simulation results show that the SF-SCFDE scheme described herein depicts much better BER. One reason for the better performance is frequency domain spreading which causes additional frequency domain diversity. Furthermore, the techniques of the exemplary embodiments do not suffer the PAPR (peak to average power ratio) problem.

Figure 3:
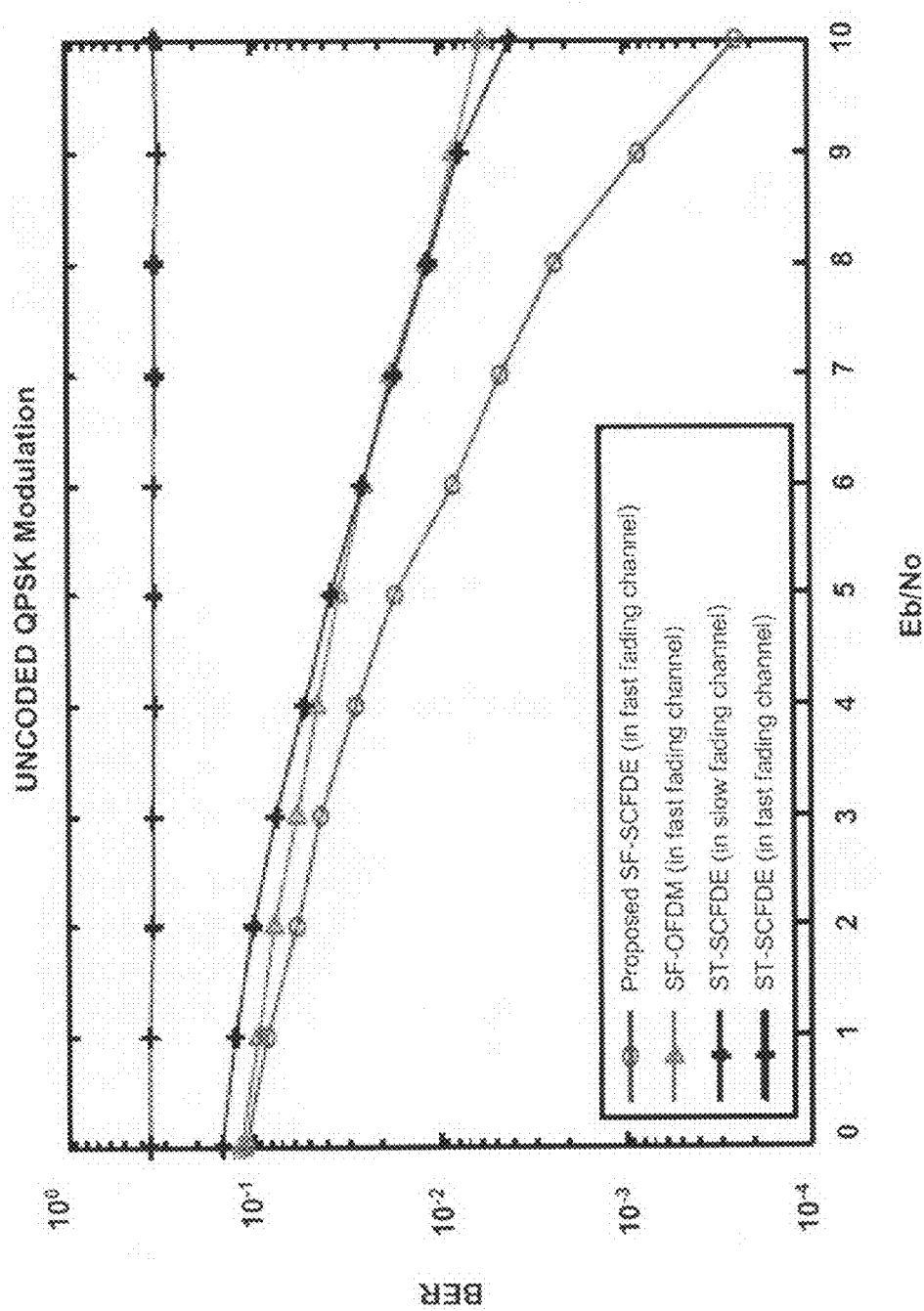
FIG. 3 is a graph comparing the single carrier space-frequency (SF-SCFDE) transmission scheme of the transmitter of FIG. 1 with other transmission schemes.

FIG. 3 is a graph showing a performance comparison of the exemplary SF-SCFDE described herein with ST-SCFDE of Lee and Williams (left) and SF-SCFDE with SF-OFDM of Younis (right) in slow (fdTs=0.001) and fast (fdTs=0.05) fading COST207 six-ray typical urban (TU) channel.

The foregoing description of exemplary embodiments has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method for single carrier space-frequency (SF-SCFDE) transmission over frequency selective and fast fading channel, the method comprising: receiving communication block streams; encoding the received communication block streams to produce communication blocks; compressing the communication blocks to form compressed vectors; repeating the compressed vectors to form vector blocks; phase shifting the vector blocks using a phase shifting matrix to form phase shifted vector blocks, wherein the phase shifting matrix comprises a diagonal matrix that is based at least in part on a number of symbols in at least one of the communication block streams, and wherein the phase shifting matrix is defined $\phi_{4N}=\text{diag}(1, e^{j2\pi/4N}, e^{j2\pi 2/4N}, \ldots, e^{j2\pi(4N-1)/4N})$, where N comprises the number of symbols; adding a cyclic prefix to each phase shifted vector block to form transmission blocks; and communicating each transmission block through a frequency selective fading channel.

2. The method of claim 1, wherein receiving the communication block streams further comprises de-multiplexing data symbols into multiple communication block streams.

3. The method of claim 1, wherein the compressed vectors are repeated twice to form the vector blocks.

4. The method of claim 1, wherein the frequency selective fading channel is of an order L such that a channel impulse response between a transmit antenna and a receive antenna is represented as $h_k=[h_k(0), h_k(1), \ldots, h_k(L-1)]$ where $h_k(l)$ is the $l^{th}$ response.

5. The method of claim 1, wherein communicating each transmission block through a frequency selective fading channel comprises transmitting the transmission block by a $k^{th}$ transmit antenna using an N-point Discrete Fourier Transform (DFT) where a 4N-point DFT of a 4N elements vector of the form $[P_e^T, P_e^T]^T$ where $P_e=[p(0),0,\ldots,p(N-1),0]^T$ is $[P_e^T, P_e^T]^T$ where $P_e=[P(0)0,\ldots,P(N-1),0]^T$ and the vector $[P(0), P(1), \ldots, P(N-1)]^T$ is the N-point DFT of $[p(0), p(1), \ldots, p(N-1)]^T$.

6. The method of claim 1, further comprising, at a receive antenna, removing the cyclic prefix and taking a 4N-point Discrete Fourier Transform (DFT).

7. An apparatus for single carrier space-frequency (SF-SCFDE) transmission over frequency selective and fast fading channel, the apparatus comprising: a space-frequency encoder that receives and encodes communication block streams to form communication blocks; a compressor to compress the communication blocks to form compressed vectors; circuitry to repeat the compressed vectors to form vector blocks; a phase shifter to phase shift the vector blocks using a phase shifting matrix to form phase shifted vector blocks, wherein the phase shifting matrix comprises a diagonal matrix that is based at least in part on a number of symbols in at least one of the communication block streams, and wherein the phase shifting matrix is defined by: $\phi_{4n}=\text{diag}(1, e^{j2\pi/4N}, e^{j2\pi 2/4N}, \ldots, e^{j2\pi(4N-1)/4N})$, where N comprises the number of symbols; a cyclic prefix adder that adds a cyclic prefix to each phase shifted vector block to form transmission blocks; and antennas that communicate each transmission block.

8. The apparatus of claim 7, further comprising a de-multiplexer that de-multiplexes data symbols into the communication block streams.

9. The apparatus of claim 7, wherein the antennas that communicate each transmission block communicate using a fast fading channel.

10. A system for single carrier space-frequency (SF-SCFDE) transmission over frequency selective and fast fading channel, the system comprising: a transmitter having a space-frequency encoder that receives and encodes communication block streams, a compressor to compress the communication blocks to form compressed vectors, circuitry to repeat the compressed vectors to form vector blocks, a phase shifter to perform a phase shift of the vector blocks using a phase shifting matrix to form phase shifted vector blocks, wherein the phase shifting matrix comprises a diagonal matrix that is based at least in part on a number of symbols in at least one of the communication block streams, a cyclic prefix adder that adds a cyclic prefix to each phase shifted vector block to form transmission blocks, and antennas that communicate each transmission block, wherein the phase shifting matrix is defined by: $\Phi_{4N}=\text{diag}(1, e^{j2\pi/4N}, e^{j2\pi 2/4N}, \ldots, e^{j2\pi(4N-1)/4N})$, where N comprises the number of symbols; and a receiver having antennas that receive the transmission blocks from the transmitter, a structure to remove the cyclic prefix, and a decoder.

11. The system of claim 10, wherein the transmitter further includes a de-multiplexer that de-multiplexes data symbols into the communication block streams.

12. The system of claim 11, wherein the receiver takes a 4N-point Discrete Fourier Transform (DFT) of the communication blocks after the cyclic prefix is removed.

13. The system of claim 10, wherein antennas communicate the transmission blocks through a frequency selective fading channel.

14. The system of claim 13, wherein the frequency selective fading channel is of an order L such that a channel impulse response between the transmitter and the receiver is represented as $h_k=[h_k(0), h_k(1), \ldots, h_k(L-1)]$ where $h_{k(l)}$ is the $l^{th}$ response.

15. The system of claim 13, wherein communication through the frequency selective fading channel uses a $k^{th}$ transmit antenna with an N-point Discrete Fourier Transform (DFT) where a 4N-point DFT of a 4N elements vector of the form $[P_e^T, P_e^T]^T$ where $P_e=[p(0)0, \ldots, p(N-1),0]^T$ is $[P_e^T, P_e^T]^T$ where $P_e=[P(0),0,\ldots,P(N-1),0]^T$ and the vector $[P(0), P(1), \ldots P(N-1)]^T$ is the N-point DFT of $[p(0), p(1), \ldots, p(N-1)]^T$.

* * * * *

UNITED STATES PATENT AND TRADEMARK OFFICE
CERTIFICATE OF CORRECTION

PATENT NO. : 8,130,846 B2
APPLICATION NO. : 12/001469
DATED : December 11, 2007
INVENTOR(S) : Bar-Ness et al.

It is certified that error appears in the above-identified patent and that said Letters Patent is hereby corrected as shown below:

Column 7, line 17, in Claim 1, delete "defined" and insert -- defined by: --.

Column 8, lines 1-2, in Claim 7, delete " $\Psi_{4N}=\text{diag}(1, e^{\cdots}, e^{\cdots}, \ldots, e^{j2\pi(4\tilde{N}-1)/4N})$, " and insert -- $\Phi_{4N} = diag(1, e^{\frac{j2\pi}{4N}}, e^{\frac{j2\pi 2}{4N}}, \ldots, e^{\frac{j2\pi(4N-1)}{4N}})$ --.

Column 8, lines 27-28, in Claim 10, delete " $\Phi_{4N}=\text{diag}(1, e^{j2\pi/4N}, e^{j2\pi 2/4N}, \ldots, e^{j2\pi(4\tilde{N}-1)/4N})$, " and insert -- $\Phi_{4N} = diag(1, e^{\frac{j2\pi}{4N}}, e^{\frac{j2\pi 2}{4N}}, \ldots, e^{\frac{j2\pi(4N-1)}{4N}})$ --.

Column 8, line 44, in Claim 14, delete "$h_{k(l)}$" and insert -- $h_k(l)$ --.

Column 8, line 52, in Claim 15, delete "$P(1),\ldots P(N-1)]^{T}$" and insert -- $P(1),\ldots,P(N-1)]^T$ --.

Signed and Sealed this
Twenty-ninth Day of January, 2013

David J. Kappos
*Director of the United States Patent and Trademark Office*